United States Patent
Gilbert

(10) Patent No.: US 7,356,038 B2
(45) Date of Patent: Apr. 8, 2008

(54) SYSTEMS AND METHOD FOR A COMMUNICATIONS BROKER

(75) Inventor: Quenton Lanier Gilbert, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1030 days.

(21) Appl. No.: 10/244,177

(22) Filed: Sep. 13, 2002

(65) Prior Publication Data
US 2004/0052264 A1    Mar. 18, 2004

(51) Int. Cl.
*H04L 12/28* (2006.01)
(52) U.S. Cl. ........................ 370/410; 455/432
(58) Field of Classification Search ........... 370/328, 370/338
See application file for complete search history.

(56) References Cited

U.S. PATENT DOCUMENTS

| | | | |
|---|---|---|---|
| 6,069,890 A * | 5/2000 | White et al. | 370/352 |
| 6,181,935 B1 * | 1/2001 | Gossman et al. | 455/433 |
| 6,256,382 B1 * | 7/2001 | Toda | 379/355.01 |
| 6,922,413 B1 * | 7/2005 | Hume et al. | 370/410 |
| 2002/0183060 A1 * | 12/2002 | Ko et al. | 455/432 |

* cited by examiner

*Primary Examiner*—Robert W. Wilson
(74) *Attorney, Agent, or Firm*—Coulter C. Henry; Parks Knowlton LLC; Paul E. Knowlton, Esq.

(57) ABSTRACT

Systems and method for a communications broker include a memory with a look-up table, one or more connections to associated communications networks and a processor. The processor is configured to receive a phone number and a request for information related to the phone number and utilizes the look-up table to determine a communications network associated with the phone number. The processor is further configured to transmit the request to the communications network for the information related to the phone number, receive a first response to the request and transmit a second response. Other systems and methods are also provided.

14 Claims, 8 Drawing Sheets

SYSTEMS AND METHOD FOR A COMMUNICATIONS BROKER

FIELD OF THE INVENTION

The invention generally relates to services provided by telecommunication providers. More particularly, the invention relates to a communications broker used in conjunction with an Advanced Intelligent Network ("AIN") to retrieve information relating to phone numbers and provide various services to telecommunication users.

BACKGROUND OF THE INVENTION

In current cellular or land line telecommunications systems using an AIN to implement services, such as one number calling, and phone and roaming status queries, one or more of the AIN system components communicate with the telecommunications network in which the phone is operating. FIG. 1 illustrates a service node or service control point ("SCP") 104 running an application 102. Application 102 determines the type of communications network over which a call is transmitted to a user.

After the determination is made, a query is sent to the telecommunications network using the appropriate communications logic. For example, if it is a TDMA network, ANSI 41 logic 106 is used to construct an ANSI 41 message with the appropriate parameters and send the message, via SS7 signaling, to the TDMA network 108. As another example, if it is a GSM network, Map logic 110 is used to construct a map message with the appropriate parameters and send the message, via SS7 signaling, to the GSM network 112. In turn, TDMA and GSM networks (108 and 112) communicate with their respective phones (114 and 116) to retrieve the requested information. Once the network has received the requested information, a response is forwarded to the appropriate communications logic in application 102 for the response to be un-marshaled and used.

In one possible operation of the telecommunication system discussed above, if application 102 wished to determine whether a mobile or land line phone is available or unavailable, the telecommunication system may attempt to call the phone number associated with the phone, through the appropriate communications logic and the communications network in which the phone is operating. In attempting to call the phone, if the phone is not answered or the caller hangs up, the telecommunications network may exhaust four or five ring cycles before proceeding to call the next phone number.

To implement the operation discussed above, at the application level, a determination is made as to the type of telecommunications network (e.g., TDMA, GSM, or some other communications network). Then, based on the determination of the type of telecommunications network, the appropriately formatted message is sent to the telecommunications network; and, upon receipt of a response, the response is un-marshaled into the appropriate format for application 102.

To develop an application, which performs the functions described above, a developer requires a hardware platform, such as a service node, a service control point, a PC, or some other component of the AIN with the appropriate interface cards (e.g., SS7 cards) to the telecommunications networks. In addition to the required hardware, the developer will also require knowledge of the protocols used to communicate with the various telecommunications networks (e.g., ANSI 41 and map protocols) and the ability to set up the chosen hardware platform.

SUMMARY OF THE INVENTION

Methods, systems, and articles of manufacture consistent with embodiments of the present invention overcome the deficiencies in retrieving information related to a phone number in an AIN. The embodiments of the present invention comprise: a memory with a look-up table, one or more connections to associated telecommunications networks; and a processor operative to: receive a phone number and a request for information related to the phone number, utilize the look-up table to determine a telecommunications network associated with the phone number, transmit the request to the communications network for the information related to the phone number, receive a first response to the request, and transmit a second response.

More particularly, the processor of the embodiments of the present invention may receive the phone number from an API operating in an AIN component, and the telecommunications network over which the request is transmitted may be one of a number of telecommunications networks (e.g., a TDMA, GSM, or CDMA communications network). The request that is transmitted over the telecommunications network is also appropriately formatted before it is transmitted over the telecommunications network, and the first response to the request is un-marshaled before the second response is transmitted to an AIN component.

In other embodiments of the present invention, a method and an article of manufacture is provided, which perform the steps of: receiving a phone number with a request for information related to the phone number; determining a telecommunications network associated with the phone number; transmitting the request to the telecommunications network; receiving a first response to the request; and transmitting a second response.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments consistent with the principles of the present invention, examples of which are illustrated in the accompanying drawings. Wherever possible, the same reference numbers will be used throughout the drawings to refer to the same or like parts.

Embodiments consistent with the present invention may provide a communications interface or broker, which relieves a developer from the task of developing an application, acquiring the necessary hardware, and acquiring knowledge of the various telecommunication protocols to avoid missed calls and needless ring cycles, while providing information relating to a phone number to one or more components of an AIN.

In one example, embodiments of the present invention may communicate with one or more components of an Advanced Intelligent Network (AIN). The embodiments of the present invention may operate in the context of a land line and/or a mobile AIN. Therefore, a brief description of the operation of an AIN and it's various components follows.

Figure 1:
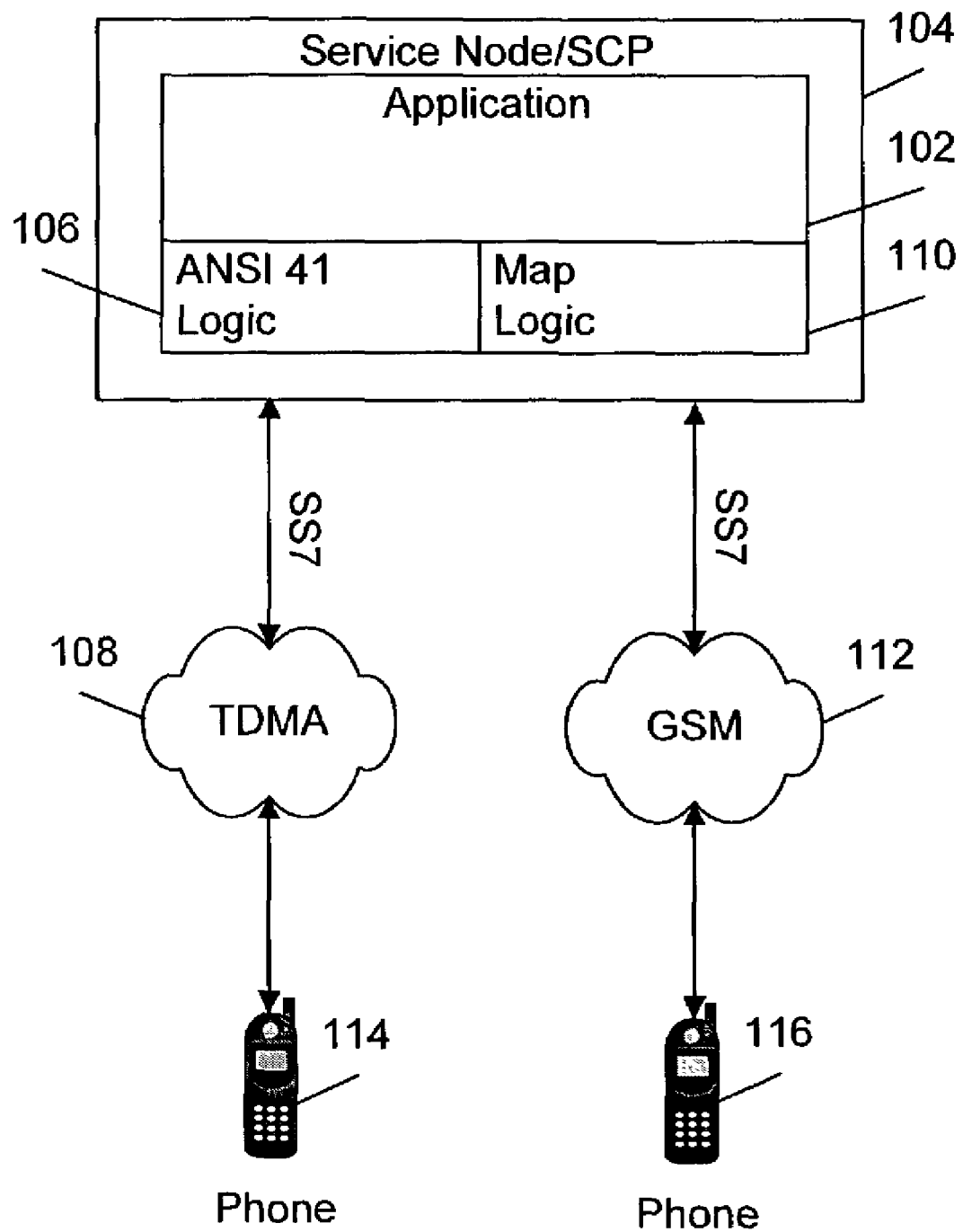
FIG. 1 is a diagram illustrating an AIN component running an application that interacts with a telecommunications network to retrieve information related to a phone number.
Figure 2:
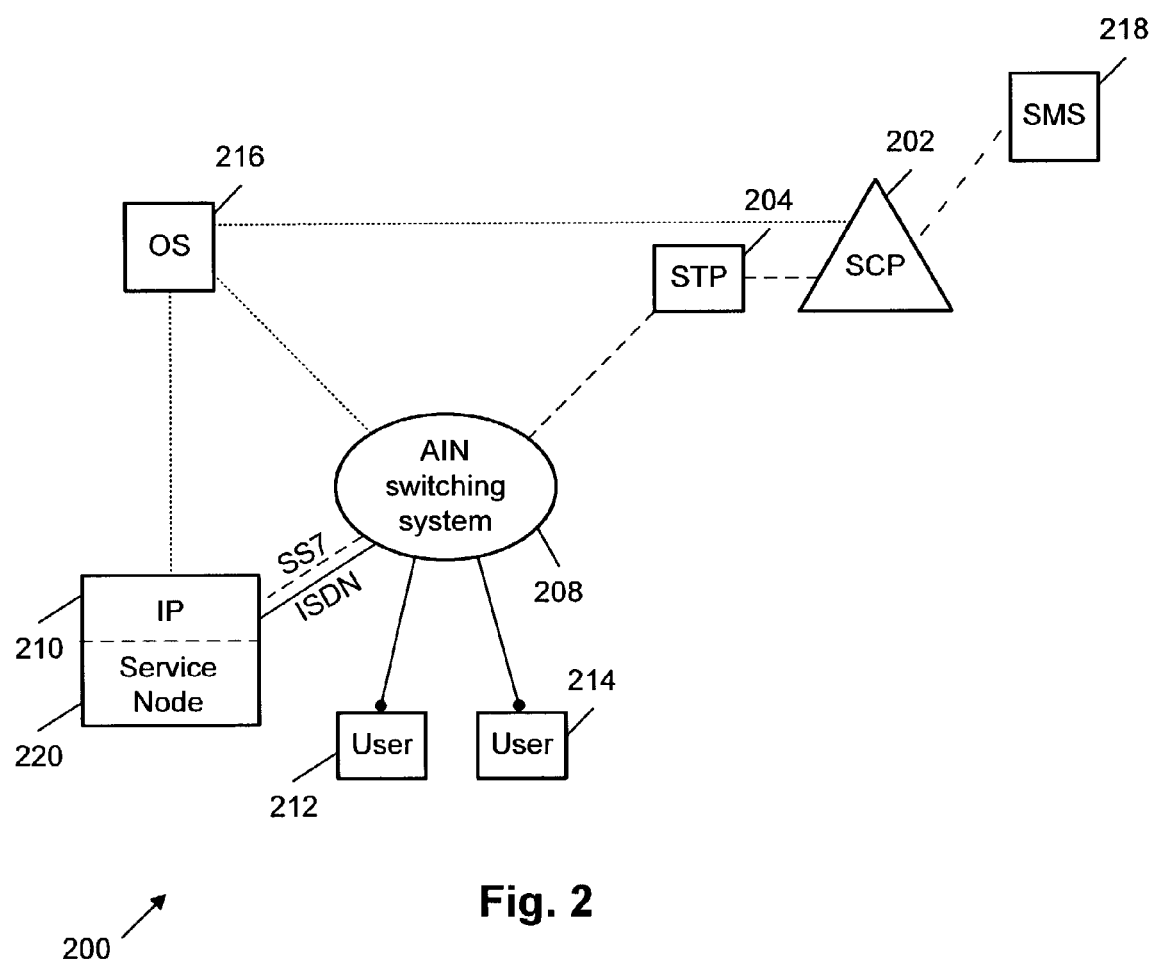
FIG. 2 is a diagram illustrating a typical land line AIN switching system.

FIG. 2 illustrates a typical land line AIN 200. In this network, a service control point ("SCP") 202, which is an offboard processor, stores call handling instructions, or service logic. A common channel signaling network allows SCP 202 to fully interconnect with an AIN switching system 208 through a signaling transport point ("STP") 204. STP 204 interconnects SCP 202 and AIN switching system 208. Calls received by AIN switching system 208 may be routed to an intelligent peripheral ("IP") 210 to request a function. IP 210 controls and manages resources or functions such as voice synthesis announcement, speech recognition, and digit collection. When IP 210 completes the function, it also collects the user's (212 and 214) information and sends it to AIN service logic (not shown), which resides in SCP 202 via AIN switch system 208.

AIN 200 may also provide: i) an operating system ("OS") 216 that provides memory administration, surveillance, network testing, and network traffic management maintenance and operation; ii) a service management system ("SMS") 218 that may provide three functions: (1) a provision function which creates services orders, provides validation, and loads records; (2) a maintenance function that resolves record inconsistency, tests call processing logic, and performs special studies; and (3) an administration function which creates service logic and maintains service data; and (iii) a service node 220, which communicates with AIN switching system 208 via the integrated services digital network (ISDN) access link and supports user interaction.

Figure 3:
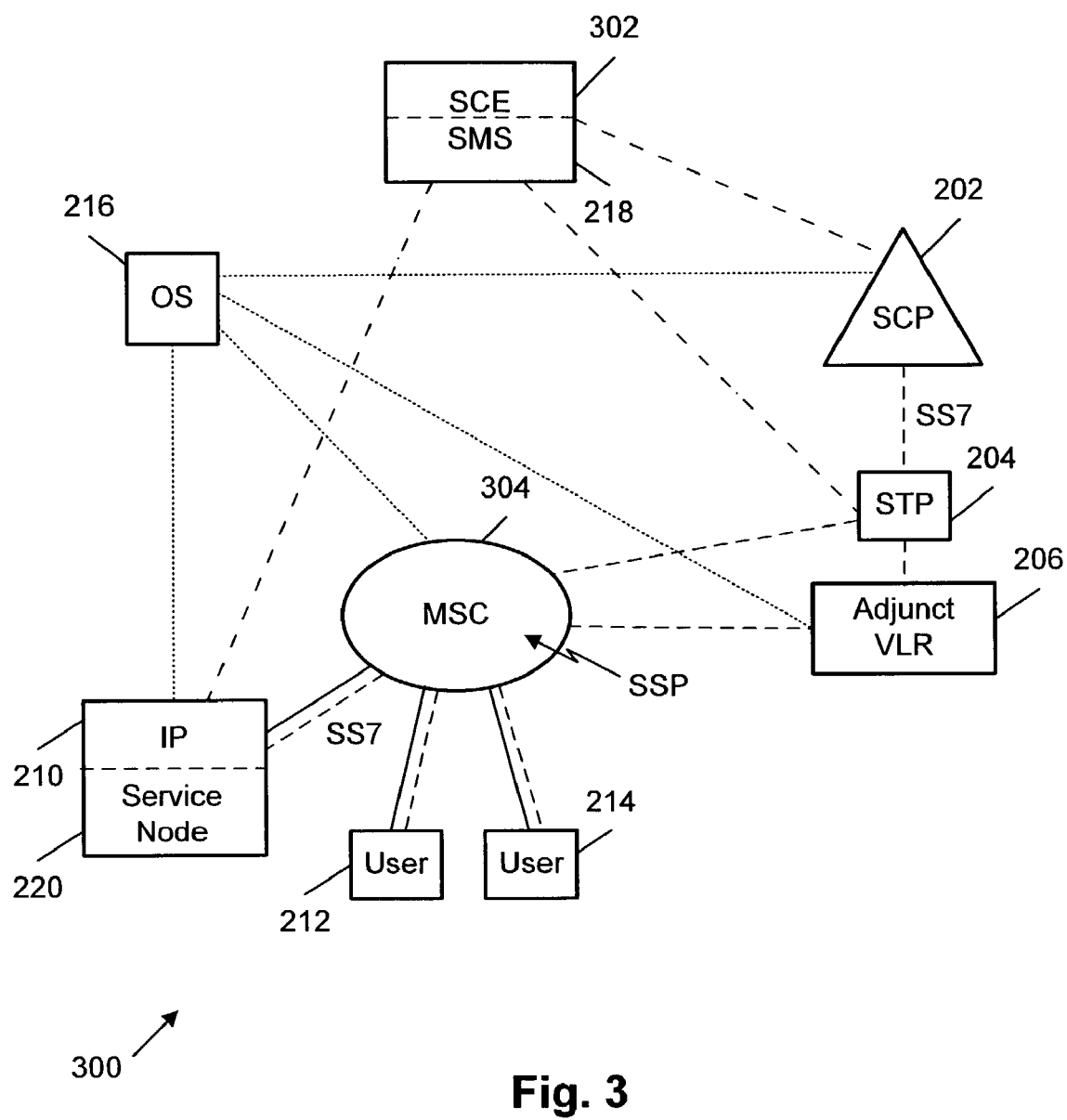
FIG. 3 is a diagram illustrating a typical mobile AIN switching system.

FIG. 3 illustrates a typical mobile AiN switching system 300, which is similar in operation to FIG. 2 except that AIN switching system 208 is replaced by Mobile Switching Center ("MSC") 304 and Short Messaging Service ("SMS") 218, which collocates with the service creation environment ("SCE") 302. SCE 302 defines new features and service. FIGS. 2 and 3 are both disclosed and discussed in William C. Y. Lee, Mobile Cellular Telecommunications (2d ed., 1995).

Figure 4:
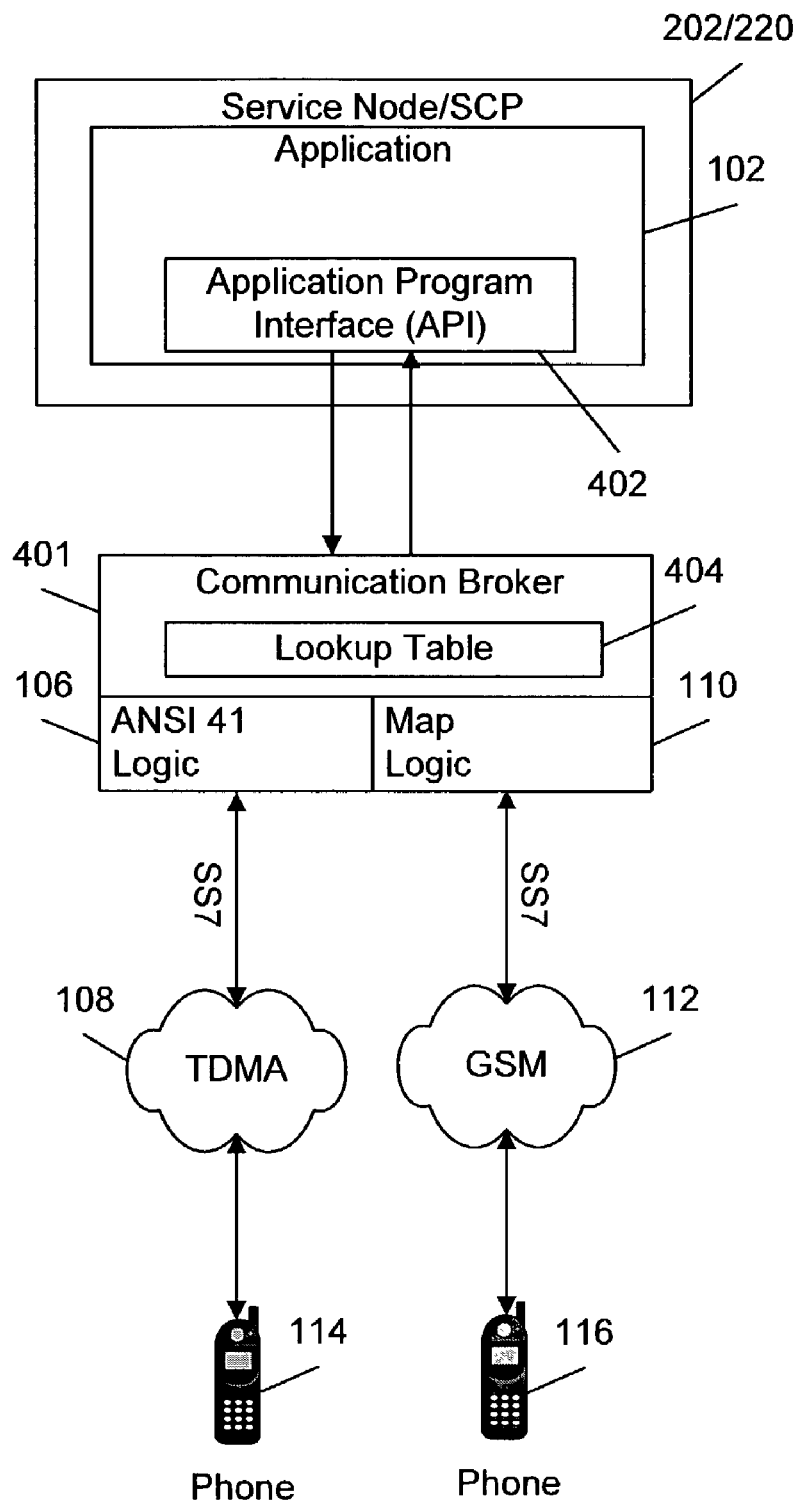
FIG. 4 illustrates an exemplary communications broker consistent with the present invention, which interacts with an AIN component and a telecommunications network to retrieve information related to a phone number.

FIG. 4 illustrates an embodiment consistent with the principles of the present invention that interacts with an AIN component in a telecommunications network to retrieve information related to a phone number. In this embodiment a standard Application Program Interface (API) 402 typically running on a service node 220 or SCP 202, or some other component of AIN 200 or 300 receives a phone number and is requested to determine information related to the phone number. For example, API 402 may be requested to determine the status (i.e., whether the phone is on or off) of the phone associated with the phone number. In order to make the determination, API 402 transmits the phone number to the communications broker 401.

Communications broker 401 then retrieves the requested information relating to the phone number received. Within communications broker 401, a look-up table 404 may be used to perform a look up, using the phone number, to determine the phone type (i.e., the type of telecommunications network on which the phone operates). Look-up table 402 may be implemented, for example, with a database, an index, or a Lightweight Directory Access Protocol ("LDAP") compliant directory. LDAP is a conventional protocol used to access a directory listing. LDAP support is being implemented in Web browsers and e-mail programs, which can query an LDAP-compliant directory.

Once the phone type is determined, a request is formatted in the appropriate format and the request is transmitted, typically using SS7 signaling, to the appropriate communications network. Then, one or more components of the telecommunications network communicate with the land line or cellular phone and retrieve the requested information.

In one exemplary embodiment, if a look up is performed and it is determined that the phone operates on a TDMA telecommunications network, the request is transferred to the ANSI 41 logic 106, where the request is formatted and then transferred, typically using SS7 signaling, to the TDMA telecommunications system 108. Within TDMA network 108, a system component (e.g., the HLR (not shown)), may communicate with the phone 114 and retrieve the requested information. For example, if a status request was sent by the HLR to phone 114, the HLR may receive a response from phone 114 indicating its status (i.e., whether it is on or off).

In another exemplary embodiment, if a look up is performed and it is determined that the phone operates on a GSM telecommunications network, the request is transferred to the Map logic 110, where the request is formatted and then transferred, typically using SS7 signaling, to the GSM telecommunications system 112. Within GSM network 112, system components (e.g., the HLR (not shown)) may communicate with the phone 116 and retrieve the requested information. For example, if a status request was sent by the HLR to phone 116, the HLR may receive a response from phone 116 indicating its status (i.e., whether it is on or off).

Once one or more system components determine the appropriate response, the response is transmitted to the appropriate logic in communications broker 401 (e.g., ANSI 41 or Map logic). The received response is then un-marshaled and a response is sent to API 402. API 402 receives a response with the requested information relating to the phone number that was originally transmitted to communications broker 401. Therefore, the application developer writing application code for service node 202, SCP 220, or any other system component may be removed from formatting and un-marshaling requests and responses sent and received by the various communication logics.

After a determination of the communications network in which the phone number operates, a roaming request may be transferred to the appropriate communications logic (e.g., ANSI 41 and Map logic). Then, the roaming request is appropriately formatted and transferred, typically using SS7 signaling, to the communications network associated with the phone number. A component (e.g., MTSO) of the communications network communicates with the phone associated with the phone number and, as a result of the communication, a response is received indicating whether the phone is roaming or not. This response is then transferred to the appropriate communications logic in communications broker 401, where the response is un-marshaled.

Once the response is un-marshaled, communications broker 401 transmits a response to API 402. API 402 receives a response indicating whether the phone associated with the phone is roaming or not.

In an embodiment of the present invention, API 402 may be implemented using, for example,: Sockets, Remote Method Invocation ("RMI"); Common Object Request Broker Architecture ("CORBA"), or Enterprise Application Integration ("EAI"). Sockets may be used in an implementation where communications broker 401 is a client and service node 202 or SCP 220 is operating as a CORBA service, or if the API 402 is coded in visual basic. RMI may be used if a JAVA implementation is used for API 402.

Furthermore, EAI may be used in corporate implementations where, for example, a JAVA message queue (not shown) is operating as API 402. In this case, communications broker 401 may subscribe to the queue and API 402 may transmit a request to communications broker 401, which in turn interrogates the communications network in which the phone number associated with the request operates, and then provides an asynchronously response to API 402.

In an embodiment of the present invention, communications broker 401 may be a network element operated by an application services provider ("ASP"). Communications broker 401 may also be a personal computer or other computing hardware containing: program logic (e.g., ANSI 41 and Map logic) necessary to communicate with the telecommunications networks in which the phones associated with the request operate; and interface cards, such as SS7 cards, for communicating with the various telecommunications networks.

Figure 5:
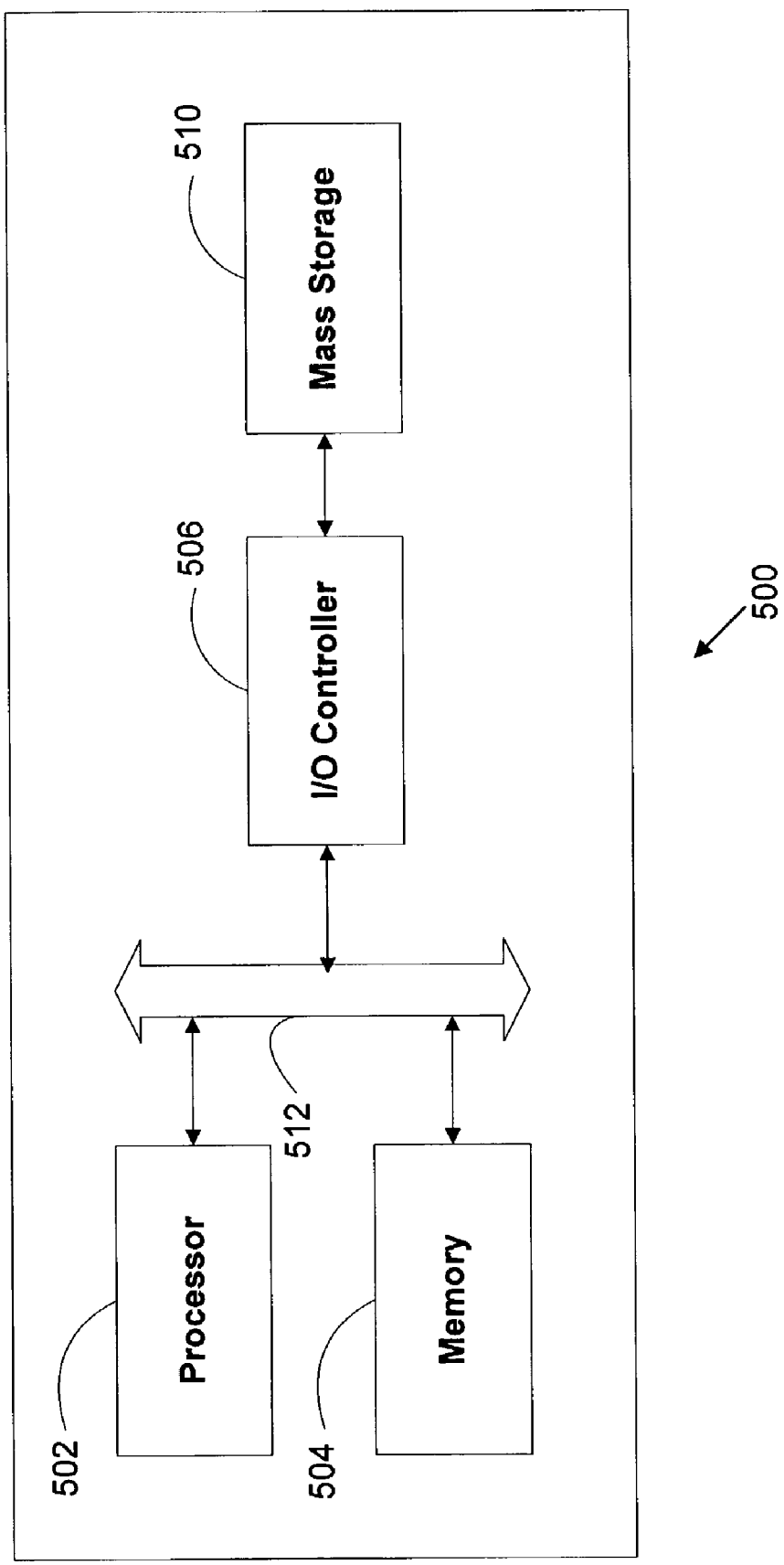
FIG. 5 is a diagram illustrating an exemplary computing-hardware platform for a communications broker.

FIG. 5 illustrates an exemplary computing-hardware platform for communications broker 401. Computing hardware platform 500 may include conventional components such as a processor 502, memory 504 (e.g. RAM), a bus 512 which couples processor 502 and memory 504, a mass storage device 510 (e.g. a magnetic hard disk or an optical storage disk) coupled to processor 502 and memory 504 through an I/O controller 506.

Figure 6:
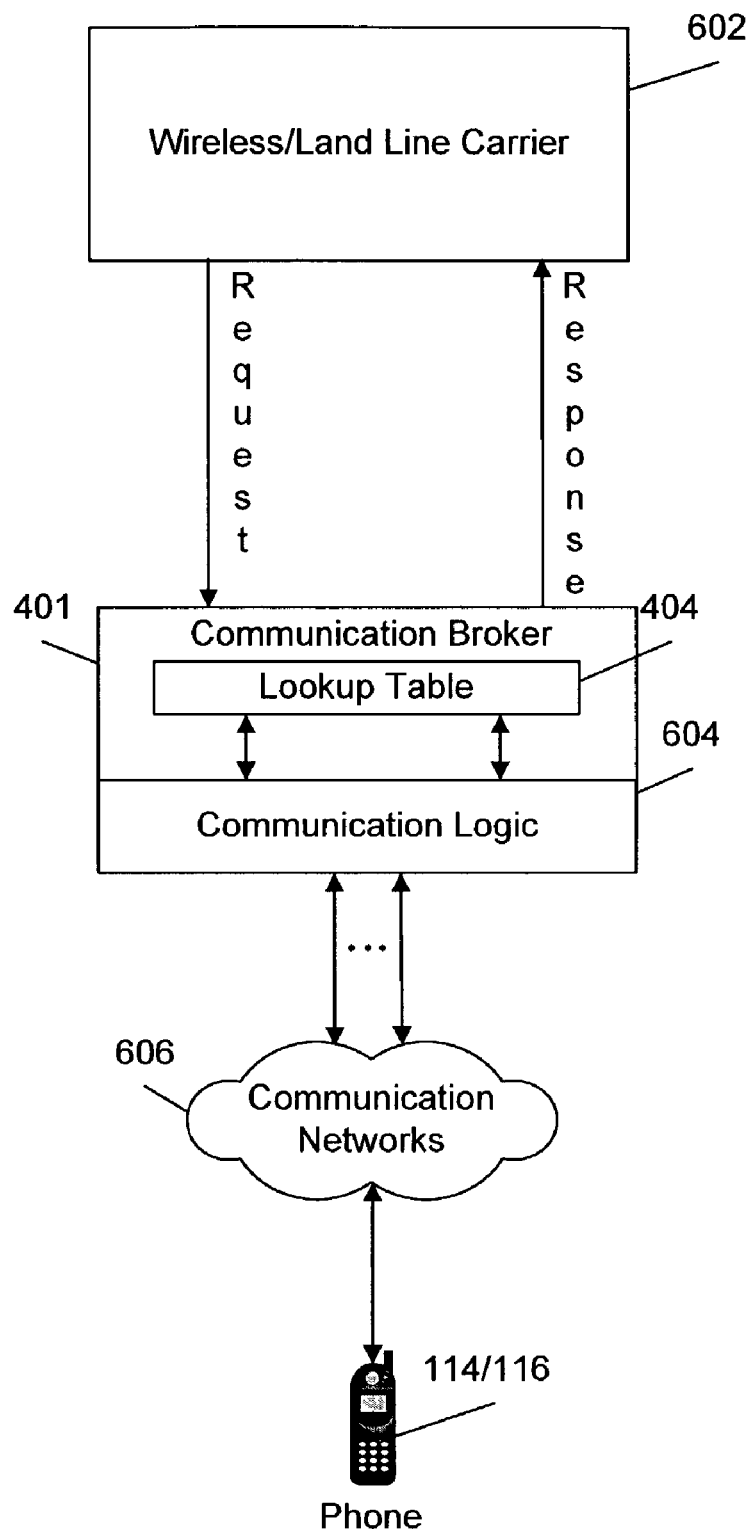
FIG. 6 is a diagram illustrating the interconnection between a carrier and a communications broker consistent with the present invention, when the exemplary communications broker is operating as a service bureau.

In another embodiment, communications broker 401 may operate as a service bureau where a wireless or land line carrier may send a request whenever information related to a phone number is required, and an appropriate response to the request is provided. FIG. 6 is a diagram illustrating the interconnection between a carrier and communications broker 401, when the communications broker is operating as a service bureau.

When operating as a service bureau, communications broker 401 may be located anywhere as long as a carrier is able to transmit a request to communications broker 401 and communications broker 401 is able to communicate with the various telecommunications networks 606 (communication links to phones 114 and 116). As mentioned above, communications broker 401 communicates with telecommunications networks 606, through look-up table 404 and communication logic 604, to retrieve the requested information, and transmit an appropriate response to the carrier 602.

Figure 7:
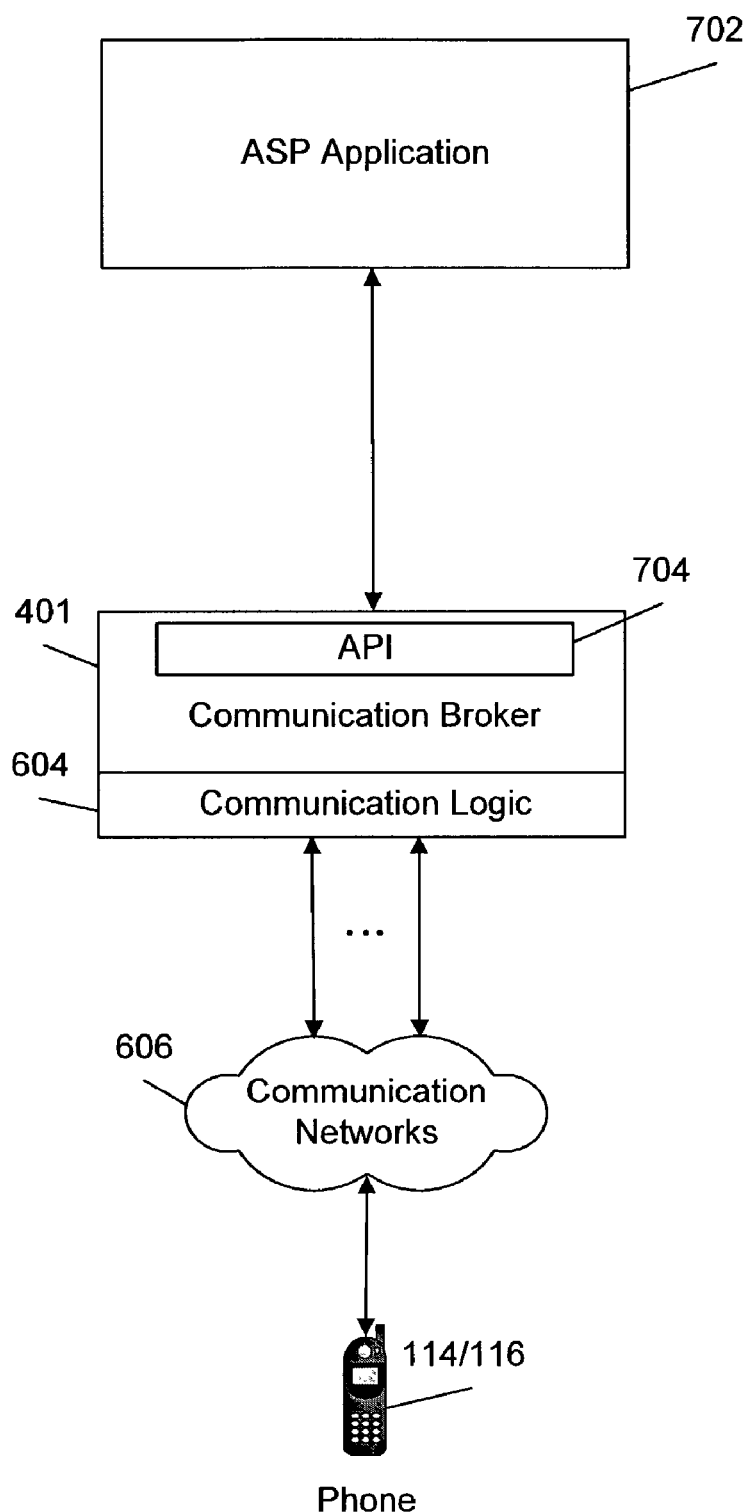
FIG. 7 is a diagram illustrating the interconnection between a carrier and a communications broker consistent with the present invention and an ASP application.

In a further embodiment, communications broker 401 may interface to an ASP application. FIG. 7 is a diagram illustrating the interconnection between communications broker 401 and an ASP application. In this embodiment of the present invention, communications broker 401 may be provided a point code for entry into the ASP application 702. Using an API 704 and the point code, communications broker 401 may retrieve the request from the application. Then, using look up table 404 and communication logic 604, communications broker 401 may communicate with various telecommunications networks 606, retrieve the requested information, and transmit a response to ASP application 702.

Figure 8:
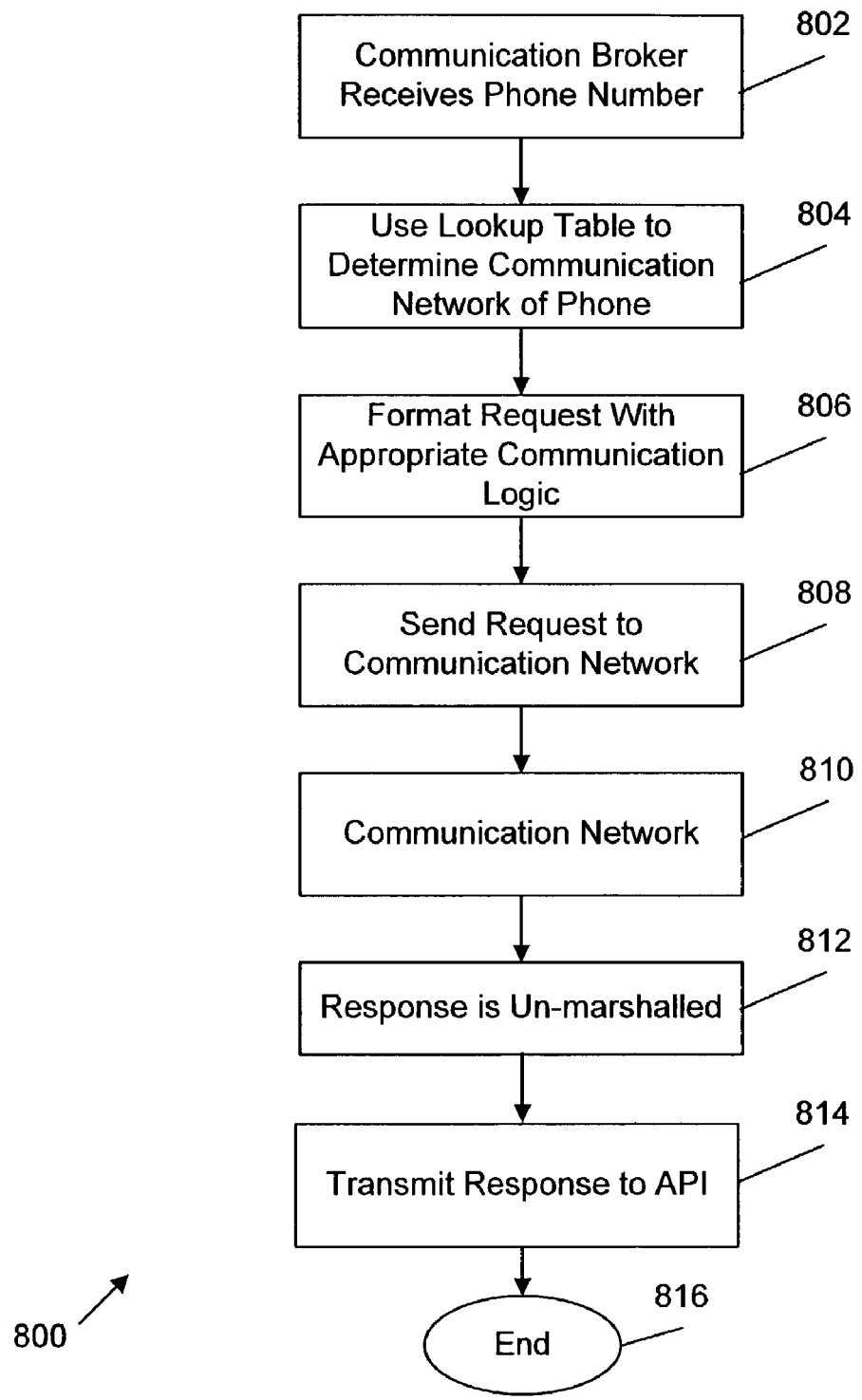
FIG. 8 is a flow chart illustrating a method of operation for the communications broker consistent with the principles of the present invention.

In yet a further embodiment of the present invention, a method is provided for retrieving information related to a phone number. For example, the method may be required to determine the functional status (i.e., whether the phone is on or off) or roaming status of a phone. FIG. 8 is a flow chart illustrating method 800. Method 800 begins with communications broker 401 receiving a phone number from API 402 (Step 802). API 402 may operate on a service node 220, SCP 202, or some other component of AIN 100 or 200.

Communications broker 401 then retrieves the requested information relating to the received phone number. Within communications broker 401, a look-up table 404, which may be implemented, for example, with a database, LDAP, or index file, uses the received phone number to perform a look up to determine the phone type (i.e. the type of communications network on which the phone operates) (Step 804). Once the telecommunications network or phone type is determined, a request is formatted with the appropriate communication logic (Step 806) and the request is transmitted, typically using SS7 signaling, to the telecommunications network (Step 808). Then, one or more components of the telecommunications networks communicate with the phone associated with the received phone number and retrieve the requested information.

The network components receive the requested information from the phone, the response is transmitted from the telecommunications network to the appropriate logic in communications broker 401 (e.g., ANSI 41 or Map logic). Once the response is received by the appropriate logic from the communications network (Step 810), the response is un-marshaled (Step 812) and a response is transmitted to API 402 (Step 814) and method 800 ends (Step 816). API 402 receives a response indicating the requested information related to the phone number that was originally transmitted to communications broker 401. Therefore, the application developer writing application code for service node 202, SCP 220, or any other system component may be removed from formatting and un-marshaling requests and responses sent and received by the various communication logics.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communications broker comprising:
    a memory with a look-up table;
    one or more connections to associated communications networks; and
    a processor operative to:
    receive a phone number and a request for information related to the phone number, the request for information comprises one of information on functional status of a phone associated with the phone number and information on roaming status of the phone associated with the phone number;
    utilize the look-up table to perform a lookup using the phone number to determine a communications network associated with the phone number;
    transmit the request to the communications network for the information related to the phone number;
    retrieve the requested information from the phone;
    transmit a first response to the requested information;
    receive the first response to the request, the first response is un-marshaled and, based on information in the un-marshaled first response, a second response is composed; and
    transmit the second response.

2. The communications broker of claim 1, wherein the processor receives the phone number from an application program interface ("API" operating in an advanced intelligent network ("AIN") component.

3. The communications broker of claim 1, wherein the communications network is one of a time division multiple access ("TDMA"), global system for mobile communications ("GSM"), and code division multiple access ("CDMA") communications network.

4. The communications broker of claim 1, wherein the first response includes the information relating to the phone number.

5. The communications broker of claim 1, wherein the request is transmitted to at least one component of the communications network.

6. The communications broker of claim 5, wherein the first response is received from the at least one component of the communications network.

7. The communications broker of claim 1, wherein the request is formatted before the request is transmitted to the communications network.

8. The communications broker of claim 1, wherein the processor runs an application program interface ("API") to receive the phone number and the request for information.

9. Method for acquiring information relating to a phone number, comprising:
    receiving a phone number and a request for information related to the phone number, the request for information comprises one of information on functional status of a phone associated with the phone number and information on roaming status of the phone associated with the phone number;
    determining a communications network associated with the phone number by utilizing a look-up table for determining the communications network on which the phone operates;
    formatting the request in an appropriate communication logic before transmitting the request to the communications network;
    transmitting the formatted request to the communications network on which the phone operates;
    retrieving the requested information from the phone and transmitting a first response to the requested information;
    receiving the first response to the requested information;
    un-marshaling the first response and, based on information in the un-marshaled first response, composing a second response; and
    transmitting the second response.

10. The method for acquiring information of claim 9, further comprising receiving the phone number and the request from an application services provider ("ASP") application using an application program interface ("API").

11. A computer-readable medium comprising computer-executable instructions that, when executed preform the steps of:
    receiving a phone number with a request for information related to the phone number, the request for information comprises one of information on functional status of a phone associated with the phone number and information on roaming status of the phone associated with the phone number;
    determining a communications network associated with the phone number;
    transmitting the request to the communications network;
    retrieving the requested information from the phone and transmitting a first response to the requested information;
    receiving the first response to the request; and
    un-marshaling the first response and, based on information in the un-marshaled first response, transmitting a second response.

12. The computer-readable medium of claim 11, wherein the determining step further includes utilizing a look-up table for determining the communications network.

13. The computer-readable medium of claim 11, further comprising formatting the request before transmitting the request to the communications network.

14. The computer-readable medium of claim 11, further comprising receiving the phone number and the request from an application services provider ("ASP") application using an application program interface ("API").

* * * * *